E. F-G. GIBBS.
ADVANCING CUTTER BORING TOOL.
APPLICATION FILED AUG. 22, 1918.
1,423,209.
Patented July 18, 1922.
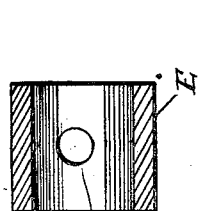
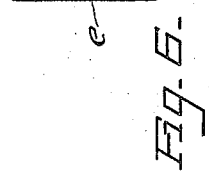
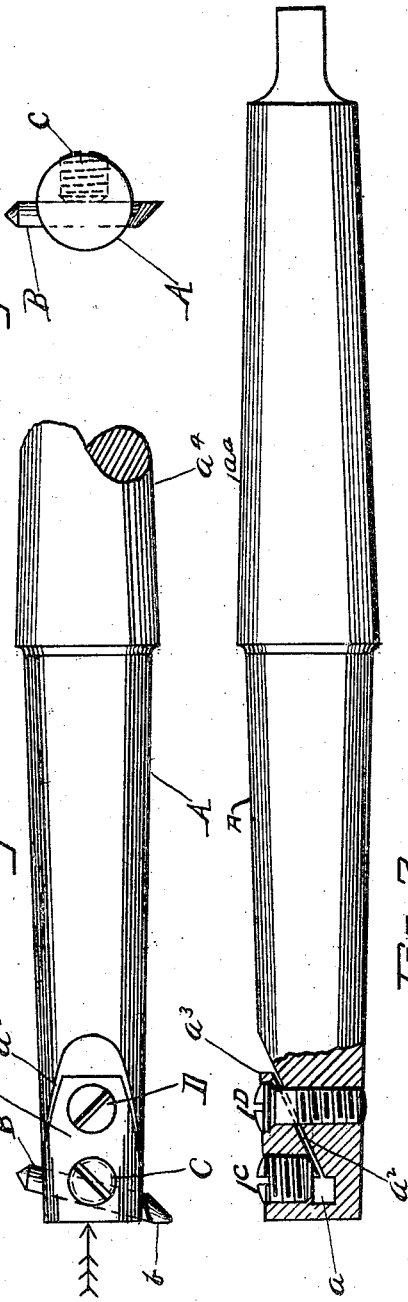
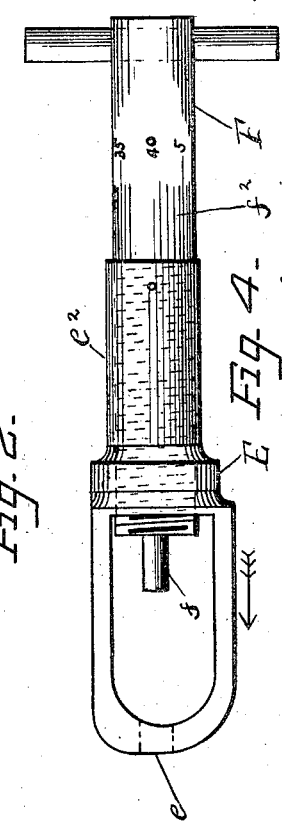
Inventor
Edward F-G. Gibbs.
Witness
M. E. Smoot

UNITED STATES PATENT OFFICE.

EDWARD F-G. GIBBS, OF WASHINGTON, DISTRICT OF COLUMBIA.

ADVANCING CUTTER-BORING TOOL.

1,423,209.

Specification of Letters Patent. Patented July 18, 1922.

Application filed August 22, 1918. Serial No. 250,981.

*To all whom it may concern:*

Be it known that I, EDWARD F-G. GIBBS, a citizen of the United States, residing at Washington, District of Columbia, have invented certain new and useful Improvements in Advancing Cutter-Boring Tools, of which the following is a specification.

This invention relates to new and useful improvements in counter-boring tools, commonly called boring bars. It may be made of perfectly straight stock, held stationary in a special holder and used on an engine lathe in the ordinary way, for boring metal, or cutting internal threads; but this particular type has a tapering body and an integral tapering shank which fits in the spindle of a milling machine, engine lathe or drill press; and revolves with the said spindle; while the work to be bored is held stationary, and the hole which is being bored, or rather, counter-bored, is increased to the desired diameter by advancing the cutter.

It is hereinafter fully described, shown in the accompanying drawing, and then specifically defined in the appended claims.

I do not mean, however, to limit my rights in any way except as required by the scope of the claims.

The objects sought in this invention are to obtain a boring bar with a powerful cutter clamping mechanism; which will not materially obstruct the normal exterior of the bar, nor loosen by reversing the strain in taking outside cuts or turning; nor require a special wrench, and one in which the cutter is held below the axial center of the bar. And a further object is to provide a one-piece cutter-holding bar and shank as a substitute for the common off-set boring head, now used largely on milling machines for counter-boring such holes as wrist-pin holes in connecting rods, in exact locations and to exact diameters. And a further object is to provide means for advancing the inserted cutter held by such bar both quickly and accurately.

I obtain these objects by the mechanism illustrated in the accompanying drawing, which forms a part of this specification; and in which drawing:—

Figure 1 is a plan view of the tool complete; and the front end of the integral shank.

Fig. 2 is a side elevation of the tool complete, minus the cutter, and showing the front end of the bar in section, the cutter holding aperture, and the push and pull screws.

Fig. 3 is a front end view of Fig. 1, as indicated by the arrow, giving another view of the cutter and push screw.

Fig. 4 is a plan view of the graduated clamp, which advances the cutter.

Fig. 5 is an edge view of the graduated clamp.

Fig. 6 is a sectional view from Fig. 4, as indicated by the arrow.

Fig. 7 is a rear end view of Fig. 5.

Reference now being had to the details of the drawing by letter, in which similar letters refer to similar parts throughout the several views, it is thus described:—

A designates the bar, the main element of the tool; a straight bar, cylindrical and tapering in this case and of uniform cross-sectional figure except, perhaps, in diameter. It has through its front end a horizontal cutter-holding aperture, $a$, transversely disposed to, but below its axis and preferably angular. In this aperture the cutter B is fitted. It has also a saw-cut or slit $a^2$, which begins on its top surface a short distance to the rear of the said cutter-holding aperture, and runs diagonally forward and downward, crossing the axial center line of the bar and into the said bar-holding aperture, where it terminates. The springy segment, thus nearly severed but still integral with the body, I call the spring (lever) clamp, $a^3$. A vertical, diametrically disposed, headless push screw C passes through the said spring clamp into the said cutter-holding aperture at a right angle to the axis of the bar and at the rear edge of the said aperture, where it presses hard upon the cutter B, holding it under spring tension. The rear end of the said spring clamp is thus forced slightly upward. But the pull screw D, which passes loosely through the rear end of the clamp, in which its enlarged head is counter-sunken, has screw-thread engagement in the bar proper; and draws the said rear end down with obviously largely increased leverage power. The rear end or shank $a^4$, of the bar A, is tapering in this case, in order to fit the tapering bore of the spindle of a milling machine or other machine tool in which it is expected to be used.

The graduated clamp shown in Figs. 4, 5, 6, and 7, consists chiefly of two parts, the yoke E, and the screw F. Its function is to advance the cutter B accurately. This is done by placing its front end about the front end of the bar so that the cutting point of the cutter will pass freely through the hole e, while the concaved and reduced front end f of the screw F is brought hard against the pointed rear end of the cutter; the pull screw D being slack and the push screw C taut at this time. The screw F now being driven, the cutter B held under spring tension by the push screw C is pushed forward. The distance it is moved is accurately indicated by the micrometer graduations $f^2$, on the body of the screw F, and they register with the zero marks on the sleeve $e^2$ of the yoke E. When the cutter has been thus advanced the desired distance, the graduated clamp is removed, the pull screw is drawn down again and the tool is ready for another cut. When only light cuts are to be taken, the pull screw may be left practically slack, the graduated camp being both powerful and accurate.

It is seen that the cutter B is angled in the plan view, for the double purpose of enabling the normal grinding line b of the cutter to coincide with the economic cutting line of the same; and to project its cutting edge forward beyond the front end of the bar.

It is not angled, however, when intended for thread cutting.

It is also to be seen from Figs. 2 and 3, that this self-supporting structure enables the axial center of the bar to intersect the top edge of the cutter-holding aperture and cutter. This facilitates setting the cutter point down to the plane of the axial center of the lathe. But this also requires the hole e and the reduced front end f of the graduated clamp screw to be lowered accordingly, which is done, as shown in Figs. 4 and 6.

If a heavy cut forces the cutter backward, its tendency is to tighten the push screw because its front face only bears on the cutter.

It is also well to observe that the main function of the push screw is to compensate for the variation in the sizes of the cutters. This requirement, however, applies chiefly to square cutters, which are best for this work. Square cutters, however, are not generally obtainable in very small sizes, while small round cutters of uniform diameters, are obtainable. Therefore, practicability suggests that the larger bars be made up for square cutters, and with push screws, and small bars for round cutters, without push screws.

It is further to be seen that both of the screws are within the limit of the peripheral lines of the bar extended.

Having thus described my invention, what I claim is:

1. A counter-boring tool comprising a straight bar; the same having a cutter-holding aperture through its front end transversely disposed to its axis; a spring clamp integral with the said bar formed by a slit beginning on its surface to the rear of said aperture and running diagonally forward into it; a cutter fitted within the said aperture; and a pull-screw near the rear end of the said clamp which engages both clamp the bar, the head of which is counter sunken into the member which it enters; all substantially as set forth.

2. A counter-boring tool, comprising a straight bar; the same having a cutter-holding aperture through its front end transversely disposed to its axis; a spring clamp integral with the said bar formed by a slit beginning on its surface to the rear of the said aperture and running diagonally forward into it; a cutter fitted within the said aperture; a headless push-screw passing through the said clamp and pressing upon the said cutter; and a pull screw with a counter-sunken head passing through the rear end of the said clamp into the body of the bar; all substantially as set forth.

3. A counter-boring tool; comprising a straight cylindrical bar, the same having a cutter-holding aperture through its front end at an oblique angle to its axis; a spring clamp integral with the said bar formed by a slit beginning on its surface to the rear of the said aperture and running diagonally forward into it; a cutter fitted within the said aperture whose cutting edge projects forward beyond the front end of the bar; a headless push-screw passing through the said clamp and pressing upon the said cutter; and a pull screw with a counter-sunken head passing through the rear end of the said clamp into the body of the bar; all substantially as set forth.

4. A counter-boring tool comprising a straight bar; the same having a cutter-holding aperture through its front end transversely disposed to its axis, the top edge of which aperture is intersected by the said axis; a spring clamp integral with the said bar formed by a slit beginning on its surface to the rear of the said aperture and running diagonally forward into it; a cutter fitted within the said aperture; a headless push screw passing through the said clamp and pressing upon the said cutter; and a pull screw with a counter-sunken head, connecting the rear end of the said clamp and body of the bar; all substantially as set forth.

5. A counter-boring tool comprising a straight bar; the same having a cutter-holding aperture through its front end transversely disposed to its axis; a spring clamp integral with the said bar formed by a slit beginning on its surface to the rear of the said aperture and running diagonally forward into it; a cutter fitted within the said aperture; a headless push screw passing diametrically through the said spring clamp and pressing upon the said cutter; a pull screw with a counter-sunken head passing through the rear end of the said clamp into the body of the bar; and a graduated screw clamp adapted to engage and advance the said cutter a given distance; all substantially as set forth.

6. A counter-boring tool, comprising a straight bar; the same having a cutter-holding aperture through its front end transversely disposed to its axis; a spring clamp integral with the said bar formed by a slit beginning on its surface to the rear of the said aperture and running diagonally forward into it; a cutter fitted within the said aperture; a headless push screw passing diametrically through the said clamp and pressing upon the rear edge of the said cutter; a pull screw with a counter-sunken head connecting the rear end of the said clamp with the bar; and means for advancing the said cutter a given distance; all substantially as set forth.

7. A counter-boring tool comprising a straight cylindrical bar; the same having a cutter-holding aperture through its front end transversely disposed to its axis; a cutter fitted within the said aperture; means for clamping the said cutter; and a graduated screw clamp adapted to advance the said cutter a given distance; all substantially as set forth.

In testimony whereof I affix my signature.

EDWARD F-G. GIBBS.